United States Patent
Varigonda et al.

(10) Patent No.: US 9,680,366 B2
(45) Date of Patent: Jun. 13, 2017

(54) DC/DC POWER CONVERTER CONTROL STRATEGY FOR SOURCE PROTECTION

(75) Inventors: Subbarao Varigonda, Manchester, CT (US); Daniel F. Orlowski, Manchester, CT (US)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/401,821

(22) PCT Filed: May 21, 2012

(86) PCT No.: PCT/US2012/038789
§ 371 (c)(1),
(2), (4) Date: Nov. 17, 2014

(87) PCT Pub. No.: WO2013/176647
PCT Pub. Date: Nov. 28, 2013

(65) Prior Publication Data
US 2015/0229202 A1 Aug. 13, 2015

(51) Int. Cl.
*H02M 3/156* (2006.01)
*H02M 3/157* (2006.01)
(Continued)

(52) U.S. Cl.
CPC ........... *H02M 1/32* (2013.01); *H01M 8/0494* (2013.01); *H01M 8/04559* (2013.01);
(Continued)

(58) Field of Classification Search
CPC ........ H02M 3/156; H02M 3/157; H02M 1/32; H02M 7/42; H02M 7/44; H02M 7/48; H02M 7/53; H02M 7/537; G05F 1/67
(Continued)

(56) References Cited

U.S. PATENT DOCUMENTS

| | | | |
|---|---|---|---|
| 4,736,150 A | 4/1988 | Wagner | |
| 5,268,832 A * | 12/1993 | Kandatsu | G05F 1/67 323/299 |

(Continued)

FOREIGN PATENT DOCUMENTS

| | | |
|---|---|---|
| CN | 2760831 Y | 2/2006 |
| CN | 102171876 A | 8/2011 |

(Continued)

OTHER PUBLICATIONS

PCT International Search Report mailed on Jan. 23, 2013 for PCT Application No. PCT/US2012/038789 (3 pages).
(Continued)

*Primary Examiner* — Adolf Berhane
*Assistant Examiner* — Sisay G Tiku
(74) *Attorney, Agent, or Firm* — Seed Intellectual Property Law Group LLP (57) ABSTRACT

A controller (11a) of a DC/DC converter (10a) responsive to power output of a fuel cell power plant (13) operates under a control strategy which determines if fuel cell voltage exceeds a limit, and if so, provided neither fuel cell output current nor DC/DC converter output current is excessive, causes an increase in DC/DC converter duty cycle to thereby increase power demanded from the fuel cell stack. This eliminates the need for conventional voltage limiting to protect fuel cells from corrosion. Digital control loops and state machines are illustrated.

5 Claims, 8 Drawing Sheets

(51) Int. Cl.
*H02M 3/158* (2006.01)
*H02M 1/32* (2007.01)
*H01M 8/04828* (2016.01)
*H01M 8/04537* (2016.01)
*H02M 1/00* (2006.01)

(52) U.S. Cl.
CPC ....... *H01M 8/04947* (2013.01); *H02M 3/156* (2013.01); *H02M 2001/0022* (2013.01)

(58) Field of Classification Search
USPC ................ 323/273, 274, 282, 283, 284, 351
See application file for complete search history.

(56) References Cited

U.S. PATENT DOCUMENTS

| | | | |
|---|---|---|---|
| 5,726,554 | A | 3/1998 | Freiman et al. |
| 7,719,236 | B2* | 5/2010 | Hartular ................ H02M 3/156 307/66 |
| 8,068,352 | B2* | 11/2011 | Yu ............................ H02J 3/38 307/16 |
| 8,343,673 | B2* | 1/2013 | Yamashita ........ H01M 8/04619 429/428 |
| 8,445,153 | B2* | 5/2013 | Yoshida .............. B60L 11/1881 429/428 |
| 8,982,592 | B2* | 3/2015 | Tan ........................... G05F 1/67 363/131 |
| 8,996,182 | B2* | 3/2015 | Mori .................. B60L 11/1881 429/428 |
| 9,130,401 | B2* | 9/2015 | Adest ................ H01L 31/02021 |
| 2003/0012989 | A1* | 1/2003 | Ueda ................. H01M 8/04231 429/415 |
| 2003/0157379 | A1* | 8/2003 | Kambouris et al. .............. 429/9 |
| 2005/0168160 | A1 | 8/2005 | Clavier |
| 2006/0006832 | A1* | 1/2006 | Kitajima .................. B60K 6/26 318/800 |
| 2006/0029845 | A1* | 2/2006 | Konoto ............ H01M 8/04619 429/431 |
| 2006/0093880 | A1* | 5/2006 | Igarashi ........... H01M 8/04328 429/429 |
| 2006/0275634 | A1 | 12/2006 | Deng et al. |
| 2007/0275276 | A1* | 11/2007 | Saeki et al. ...................... 429/13 |
| 2008/0032162 | A1* | 2/2008 | Hirakata ........... H01M 8/04037 429/430 |
| 2008/0116873 | A1* | 5/2008 | Takada et al. ................. 323/299 |
| 2008/0311452 | A1* | 12/2008 | Takada .............. H01M 8/04089 429/432 |
| 2009/0230917 | A1 | 9/2009 | Kojima et al. |
| 2010/0316921 | A1* | 12/2010 | Yoshida .............. B60L 11/1881 429/432 |
| 2010/0316922 | A1* | 12/2010 | Hamada .................. B60L 1/003 429/432 |

FOREIGN PATENT DOCUMENTS

| | | |
|---|---|---|
| JP | 4-61489 U | 5/1992 |
| JP | 10-075540 A | 3/1998 |
| WO | 2005/081387 A1 | 9/2005 |
| WO | 2007/039091 A1 | 4/2007 |
| WO | 2010/039109 A1 | 4/2010 |

OTHER PUBLICATIONS

Extended European Search Report, mailed Apr. 20, 2016, for corresponding European Application No. 12877236.5-1809 / 2853023, 6 pages.

Chinese Office Action, dated Aug. 22, 2016, for corresponding Chinese Application No. 201280073401.9, 8 pages.

* cited by examiner

DC/DC POWER CONVERTER CONTROL STRATEGY FOR SOURCE PROTECTION

TECHNICAL FIELD

A DC/DC power converter control strategy includes response to a critical parameter, such as output voltage of a DC power source, such as a fuel cell, to alter the converter output in a manner which a) tends to cause the value of the critical parameter to be below a limiting value, b) but may drive another critical parameter of the source or of the converter below a limiting value.

BACKGROUND ART

DC/DC power converters are used in a variety of power systems, such as fuel cell/battery hybrid power propulsion systems currently in use in operational buses. The DC/DC power converters can either be boost type, if the desired output voltage is higher than the available input voltage, or it can be buck type if the desired output voltage is lower than the available input voltage. DC/DC converters may also be bidirectional, allowing power flow in both directions, or they may be unilateral, allowing power flow in only one direction.

The typical prior art DC/DC converter associated with a fuel cell stack is controlled by a system, which is usually digital, that adequately controls the converter input current (which is the output current of the DC power source e.g., fuel cell stack) and the converter output current and voltage. However, prior strategies have not been effective for managing DC power source output voltage constraints. Fuel cells have a monotonic voltage/current performance curve relationship. At low output power, the voltage of each cell can become sufficiently high to cause corrosion of the cathode and anode catalysts and the carbon catalyst supports. This corrosion causes permanent decay in the performance of the fuel cell.

Heretofore, prevention of fuel cell performance decay, as a result of catalyst and support corrosion at high cell voltages, has typically been prevented by means of a voltage limiting device (VLD) such as an auxiliary resistive load, which is caused to effectively be a variable load by switching it in and out of the circuit by means of an electronic switch controlled by a pulse width modulation (PWM) signal.

Figure 1:
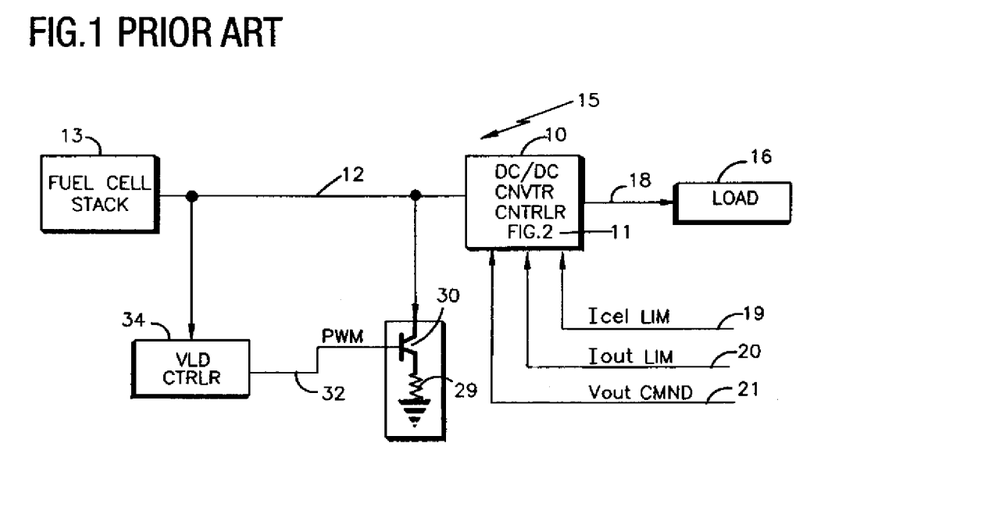
FIG. 1 is a simplified schematic block diagram of a fuel cell stack feeding a DC/DC converter known to the art, and utilizing a PWM-switched voltage limiting device.

Referring to FIG. 1, a DC/DC converter 10, in this case unidirectional, and most likely a boost converter, is shown receiving power over a line 12 from a fuel cell stack 13, in a fuel cell power plant system 15 which provides power to a load 16. The load 16 may comprise an electric motor in an electric or hybrid vehicle, or may comprise any number of loads serviced by a stationary fuel cell power plant, such as a telephone exchange, a hospital, or a power distribution system requiring peak power assistance.

In FIG. 1, a resistive auxiliary load 29 is selectively switched in and out of the circuit by means of an electronic switch 30 controlled by a PWM signal on a line 32 provided by a VLD controller 34. Whenever the cell voltage on the line 12 exceeds a threshold, typically a few hundredths of a volt below the critical corrosion threshold, the VLD controller increases the duty cycle of the switch 30, lowering the average resistance to increase current and power output. The VLD controller will decrease the duty cycle by an increment whenever the fuel cell output voltage on the line 12 decreases below a lower, safe voltage. The auxiliary load 29, in dissipating any amount of power required to retain the safe cell voltage, creates heat that must be accommodated within the confines of the apparatus involved. The VLD controller is typically separate and apart from the fuel cell power plant controller as well as the DC/DC converter controller.

The inputs to the controller of the DC/DC converter are provided on a plurality of signal lines 19-21 as illustrated in FIG. 1. The limit signal for the fuel cell stack output current (DC/DC converter input current) Icel LIM is on line 19. The converter output current limit signal, Iout LIM is on line 20. The desired converter output voltage command, Vout CMND is on line 21.

Figure 2:
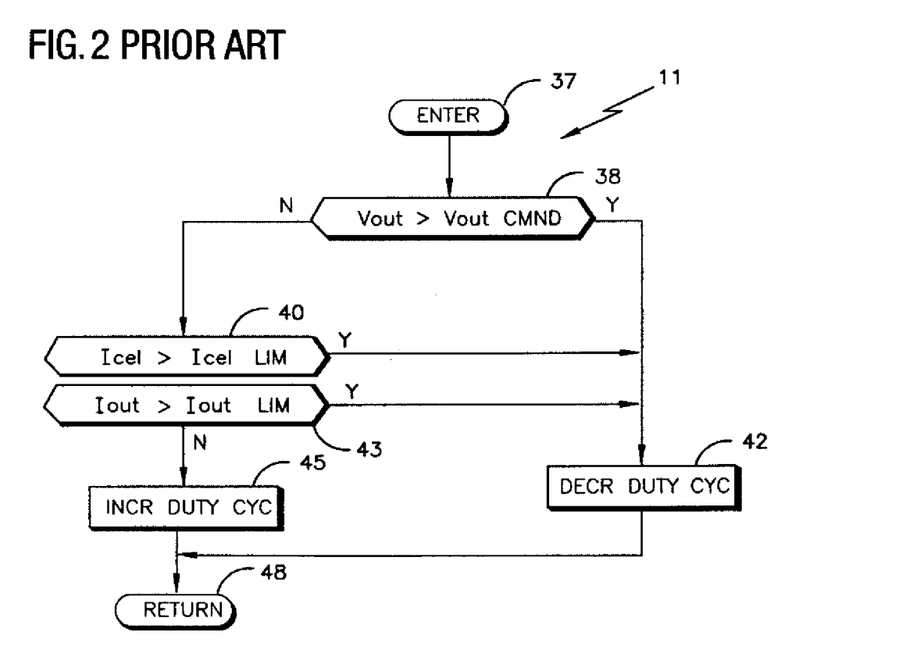
FIG. 2 is a simplified diagram of a prior art control strategy for the DC/DC converter of FIG. 1.

Referring to FIG. 2, the prior art control strategy, for the controller 11 of the DC/DC converter 10 of FIG. 1, is reached through an entry point 37 and a first test 38 determines whether the output voltage equals or is greater than the commanded output voltage, Vout CMND. If it is not, a negative result of test 38 reaches a test 40 to determine if the fuel cell output current, Icel, exceeds the corresponding limit, Icel LIM. As used herein, the term "exceeds" means, with respect to the value of a parameter, that the value has reached a less favorable side of a limit or threshold thereof. If it does, then an affirmative result of test 40 reaches a step 42 which causes a duty cycle signal for the DC/DC converter to be decreased. These currents are described more fully concerning the present strategy with respect to FIG. 4, hereinafter.

If the fuel cell output current does not exceed a corresponding limit, a negative result of test 40 reaches a test 43 to determine if the DC/DC converter output current, Iout, exceeds a related limit. If the converter output current exceeds its limit, an affirmative result of test 43 will reach the step 42 to decrement the duty cycle, causing power to diminish. But if both the fuel cell output current and the converter output current are within limits, then negative results of tests 40 and 43 will reach a step 45 to increase the duty cycle. In other words, if the output currents are both in limit, then when the voltage output is less than the commanded voltage output as indicated in test 38, the duty cycle is increased at step 45 which will increase the output voltage of the DC/DC converter and cause an increase in output power.

If the voltage output of the DC/DC converter exceeds the output voltage command, a negative result of test 38 will reach the step 42 to decrease the duty cycle. This causes a decrease in the output voltage, and a decrease in the output power. Thus, the step 45 pushes the power (increases it) whereas the step 42 causes power to be diminished (not to be pushed). After either of the steps 42, 45, other routines are reverted to through a return point 48.

SUMMARY

A control strategy for a DC/DC converter receiving power from a DC power source having a critical parameter with a limiting value, accommodates the critical parameter by adjusting converter output, and therefore altering power delivered by the source in a manner to favorably affect the value of the critical parameter, provided limits of other parameters are not exceeded.

In one example, the critical parameter is cell voltage of a fuel cell power plant wherein a voltage indicative of average or representative cell voltage is utilized to determine whether output power should be increased, thereby causing cell voltage to decrease.

In the disclosed embodiment, rather than using a voltage limiting device, typically with a pulse width modulated switching circuit and a VLD controller, the present control strategy utilizes the controller of the DC/DC converter, with fuel cell voltage as another input, to alter the mode of operation in the event that the voltage of the fuel cell stack becomes too high, to push (boost) the power output to thereby reduce the fuel cell voltage, provided other limits have not been exceeded.

The control strategy can be used with other DC sources employing power conversion by DC/DC converters, such as solar cells. In the general case, the present control strategy can be utilized in any situation where an instruction within the control strategy adjusts the output of the DC/DC converter in a manner which in turn alters a critical parameter of the DC source that provides power to the DC/DC converter.

The control strategy hereof may be used with unidirectional or bidirectional DC/DC converters of either the boost or buck type. The control strategy hereof may be used with DC/DC converters which control either the current output or the voltage output which is provided to a load.

Other variations will become more apparent in the light of the following detailed description of exemplary embodiments, as illustrated in the accompanying drawings.

MODE(S) OF IMPLEMENTATION

Figure 3:
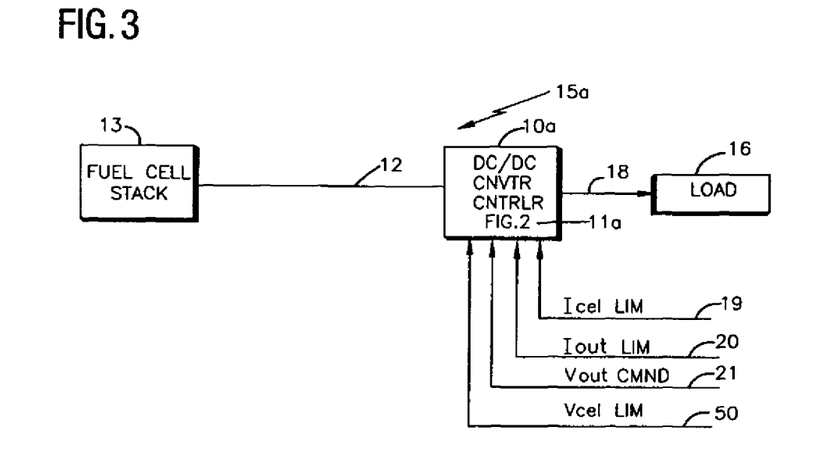
FIG. 3 is a simplified schematic block diagram of a fuel cell stack feeding a DC/DC converter using the control strategy herein.

A system employing the control strategy provided herein is within a fuel cell power plant system 15a illustrated in FIG. 3. The notable difference between FIG. 3 and FIG. 1 is that the voltage limiting auxiliary load 29 and the VLD controller 34 are absent. The important difference is that the DC/DC converter 10a has an additional input to its controller 11a, which comprises the fuel cell stack output limit signal, Vcel LIM, on a line 50.

Figure 4:
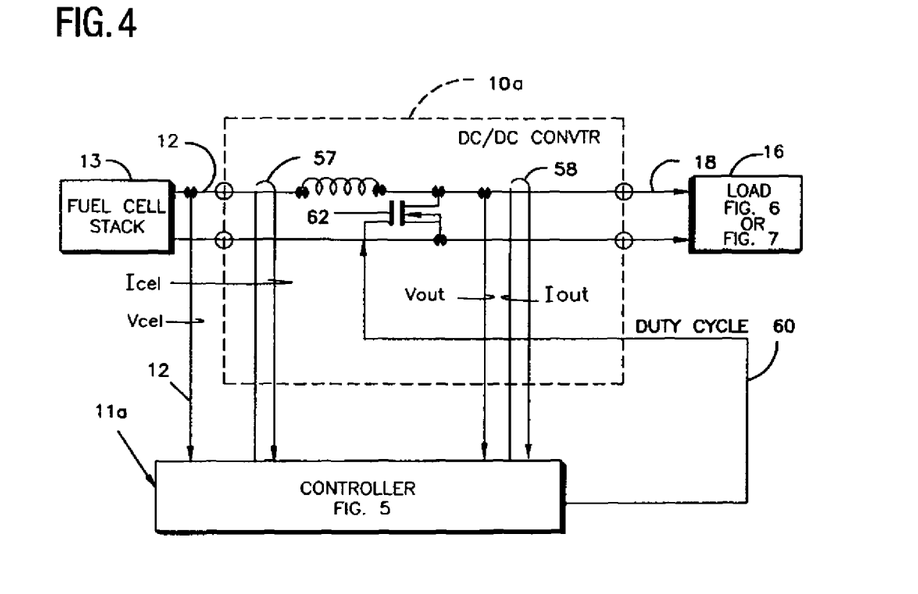
FIG. 4 is a simplified schematic illustration of the signals tested in the control strategy of FIG. 3.
Figure 5:
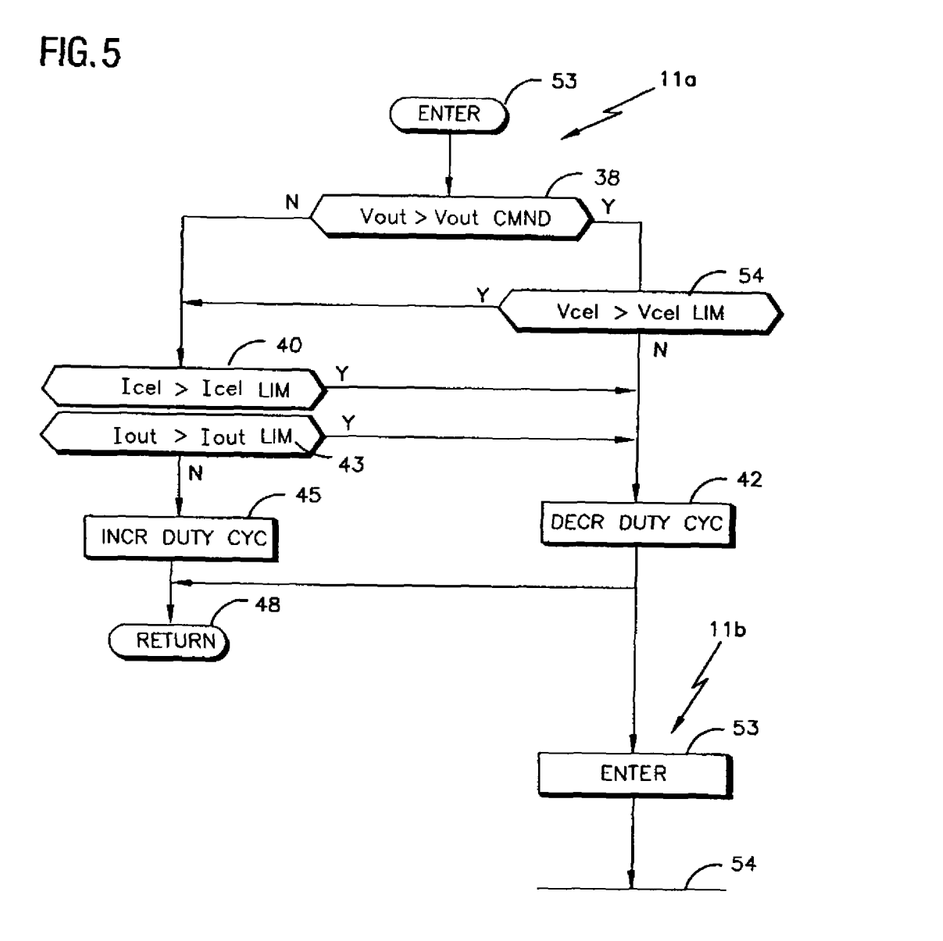
FIG. 5 is a simplified diagram of a present control strategy for the DC/DC converter of FIG. 3.

FIG. 4 illustrates for clarity the signals Vcel, Icel, Vout and Iout, provided to the controller 11a where they are tested in tests 38, 40, 43 and 54 in FIG. 5. The cell voltage is on the line 12. The cell output current, Icel, is measured by a device 57 to determine the magnitude of current in the line 12 as it enters the DC/DC converter 10a. Vout is the output voltage of the DC/DC converter on the line 18, and Iout is the current being provided on the line 18 to the load, indicated by a sensor 58.

The output of the controller 11a in FIG. 4 is a duty cycle signal on a line 60, provided to an electronic switch 62, such as an insulated gate bipolar transistor; in a unilateral DC/DC converter, the switch may comprise an insulated gate field effect transistor or another suitable electronic switch. This is the conventional manner of voltage control in a DC/DC converter. In the boost converter shown, increasing the duty cycle will increase the output voltage and/or the output current, therefore pushing power to the load, while decreasing the duty cycle will decrease the output voltage or current and therefore diminish the power provided to the load.

In FIG. 5, the controller 11a for the DC/DC converter 10a, which has the control strategy herein, is reached through an entry point 53. A first test 38 is the same as that in the prior art, and determines whether the output voltage is greater than the output voltage command. If it is, it reaches a test 54 which determines if the fuel cell voltage, Vcel, is greater than a fuel cell voltage limit, Vcel Lim. This may be a test of a single representative fuel cell, or it may be a test of the entire output voltage on the line 12, which would be N times the limiting voltage threshold, where N is the number of fuel cells in the stack. Or, it may be a summation of voltages of several representative cells, in which case the cell voltage limiting signal will comprise N times the limiting cell voltage threshold where N is the number of representative cells involved.

If the cell voltage is too high, an affirmative result of test 54 will reach the tests 40 and 43 to determine if either the output current of the fuel cell or the output current of the DC/DC converter exceeds its corresponding limit. If both tests 40 and 43 are negative, then the duty cycle is increased in a step 45 and the programming reverts to other routines through the return point 48. If pushing power, to lower cell voltage, results in either current exceeding its limit, the result of either test 40 or 43 will change to positive in the next pass of the routine of FIG. 5. This will reach step 42 to decrement the duty cycle, tending to reduce the currents.

If the cell voltage is high but either of the currents are above their limits, an affirmative result of either test 40 or 43 will prevent the duty cycle from increasing, and reach the step 42 which will decrease the duty cycle as described hereinbefore.

But whenever the output voltage of the DC/DC converter exceeds its commanded output voltage, an affirmative result of test 38 reaching the test 54 will result in a decrease in the duty cycle 42 so long as the cell voltage does not exceed its corresponding limit in the test 54.

Thus, by providing one additional control factor in the controller 11a, in accordance with the present control strategy, the apparatus 29-34 of FIG. 1 is avoided while the function of protecting the fuel cell from corrosion is readily achieved.

Figure 6:
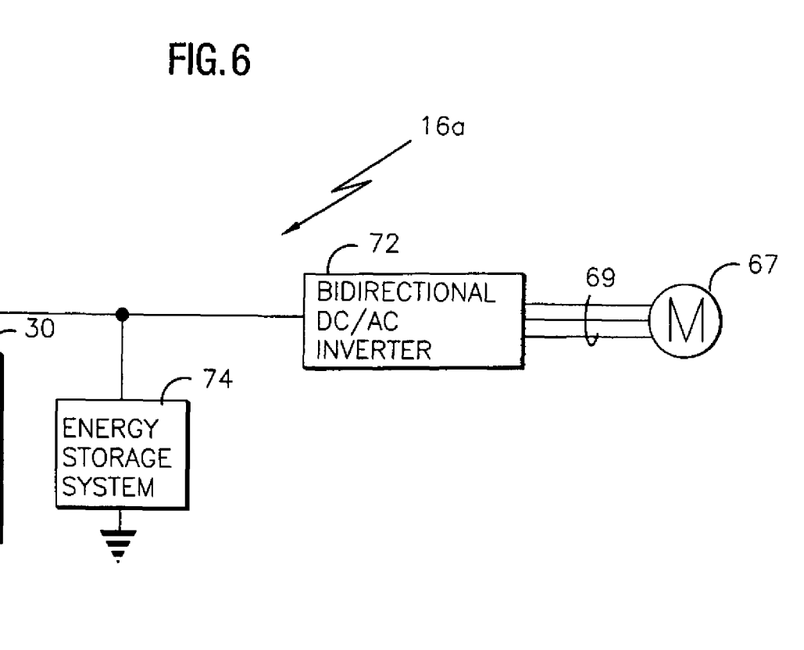
FIG. 6 is a simplified schematic block diagram of a load for the improved converter of FIG. 3 comprising an electric motor for a vehicle.

One possible load 16a for the DC/DC converter operating under the present control strategy is as the primary power for a vehicle drive illustrated in FIG. 6. The principal load in FIG. 6 is an electric motor 67 which may either be in an all electric vehicle, or in the electric motor portion of a hybrid vehicle, such as hybrid buses which are currently in service. The motor 67 receives three-phase power over a plurality of lines 69 from a bilateral DC/AC inverter 72. The inverter is bilateral to allow the motor to act as a braking device when decelerating or when traveling downhill. The power generated by the motor in the regeneration mode is applied by the inverter 72 to an energy storage system 74, which would include numerous capacitors, each of a large capacity, or when appropriate, storage batteries. The energy storage system 74 also includes a bidirectional DC/DC converter, if appropriate, and apparatus for controlling the storage or the return of energy.

Either in addition to the energy storage system 74, or in place thereof, there may be a power dissipating device (PDD) 75, which is essentially the same as the voltage limiting device referred to in FIG. 1. The power dissipating device 75 can allow use of the motor as a braking device alone, or as a backup to the energy storage system, when it is fully charged. However, the PDD 75 cannot provide energy, such as for startup of the system, as is known. The PDD may be used because it is far less expensive, and weighs significantly less, than an energy storage system, both of which are important in vehicular applications.

Concerning the DC/DC converter 10a operating with the present control strategy, if the tests in the control strategy of the DC/DC converter controller 11a in FIG. 5 result in pushing power by increasing the duty cycle at step 45, should such increase in power not be desired at the motor 67, depending on its design, the inverter 72 can adjust for the voltage difference, and either the energy storage system 74 or the power dissipation device 75 can absorb the additional power.

Figure 7:
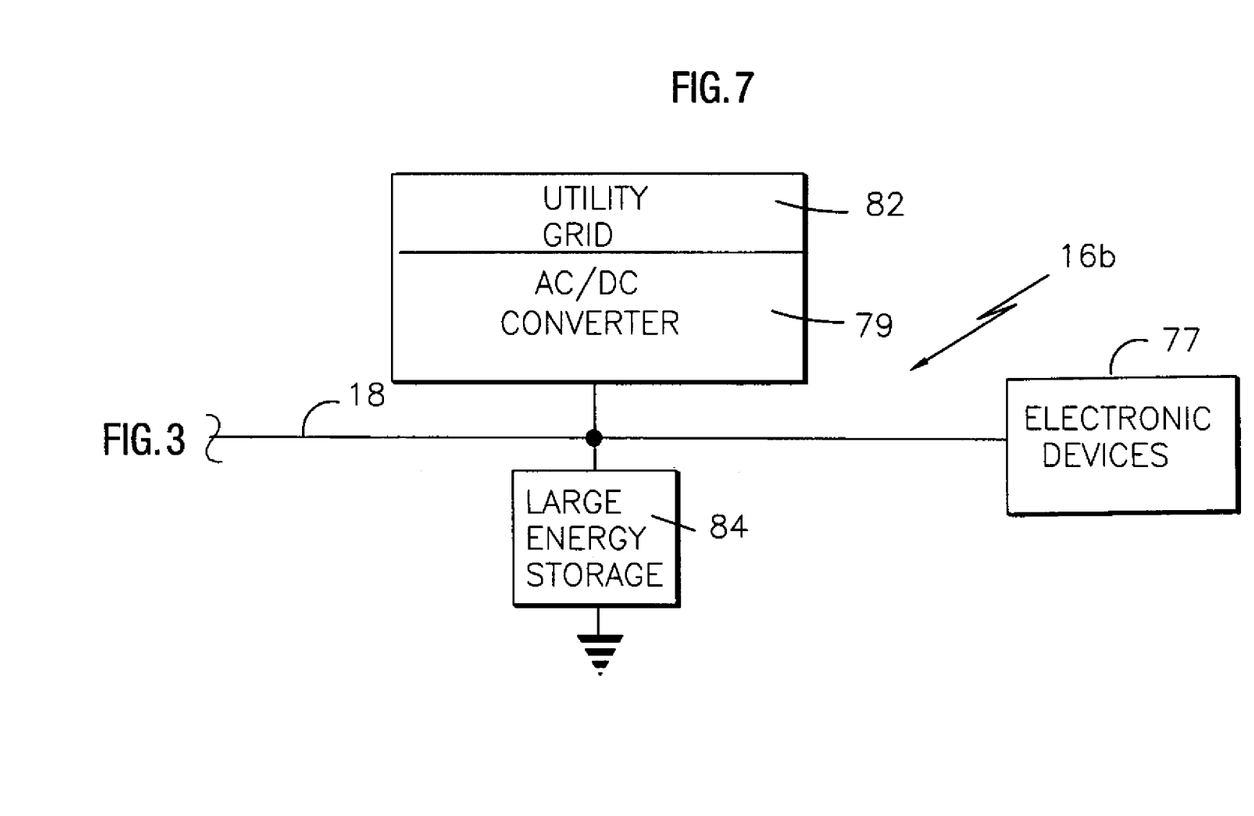
FIG. 7 is a simplified schematic block diagram of a load for the improved converter of FIG. 3 comprising a telephone exchange.

Another possible load 16b for a DC/DC converter 10a operating under the present control strategy is as backup power for a telephone exchange shown in FIG. 7. Therein, the ultimate load is electronic devices 77 operating at a moderate DC voltage, such as between about 12 and 30 volts. The principal power for the electronic devices is an AC/DC converter 79 powered from an ordinary utility grid 82. The converter 79 would likely convert three-phase, 440 volt AC power to DC power at the aforementioned nominal voltage. The AC/DC converter 79 can adjust the amount of power provided at the nominal voltage, to accommodate variable power usage of a varying number of electronic devices 77.

To accommodate interruptions in power provided by the utility grid, a large energy storage system 84 is provided. This system can provide the nominal DC voltage to the electronic devices for relatively short periods of time, and be recharged at the nominal DC voltage by the AC/DC converter 79 once power from the utility grid 82 is restored.

For longer terms of power outages, the fuel cell power plant 15a of FIG. 3 can be started to provide power on the line 18 through the DC/DC converter 10a to the electronic devices 77. Under such circumstances, the energy storage device 84 can assume any extra power generated by the fuel cell stack that is caused by the cell voltage being greater than the cell voltage limit. That is a consequence of the control strategy of FIG. 5 reaching the step 45 to increase the duty cycle thereby pushing power, as a result of the test 54. This occurs only when neither of the cell current and the converter output current are out of limits, as indicated by the steps 40 and 43 being negative.

The loads 16a and 16b of FIGS. 6 and 7 are exemplary merely, and illustrate that the pushing of power to reduce cell voltage below a corrosion limiting voltage is possible without disturbing a wide variety of loads. The loads may be using the fuel cell power plant as principal power as in FIG. 6, or as backup power as in FIG. 7. The loads may be mobile as in FIG. 6 or stationary as in FIG. 7.

The modality herein has been described as it may be implemented by means of digital routines. However, it may be implemented in other ways, such as by a state machine, as illustrated in FIGS. 8-12.

Figure 8:
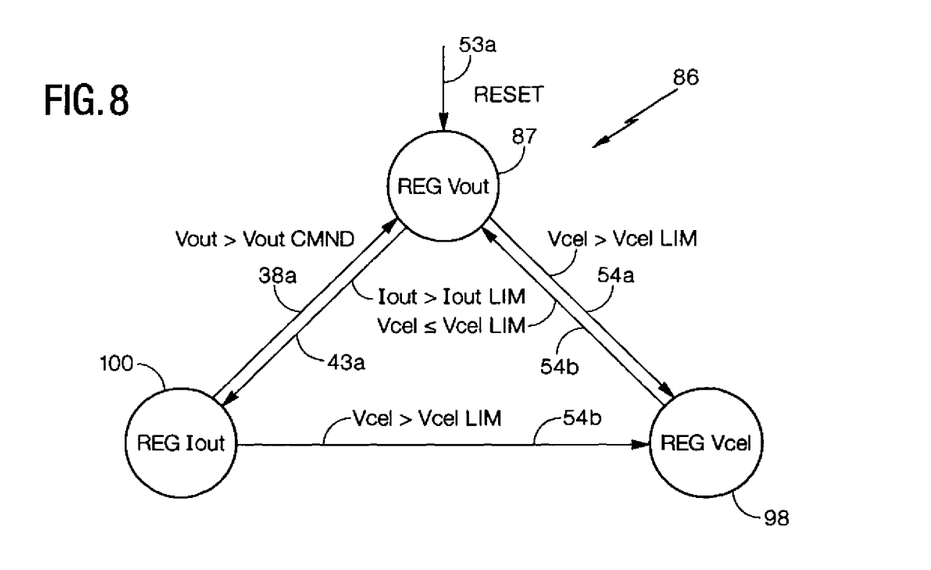
FIG. 8 is an illustration of a state machine implementing the present modality.
Figure 10:
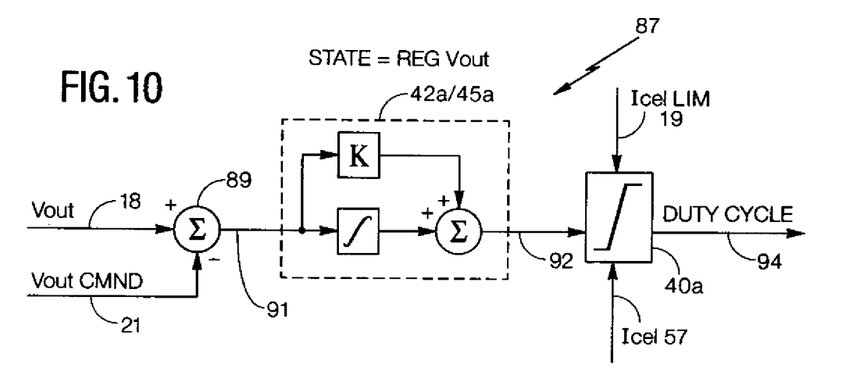
FIGS. 10-12 are simplified schematic diagrams of respective states of FIG. 8.

Any time there is a power up or any other reset, as indicated by line 53a in FIG. 8, the state machine 86 reaches a first state 87 which regulates the output voltage (Vout) of the DC/DC converter (10a, FIG. 4) on the line 18, as illustrated in FIG. 10, subject to a fuel cell current limit. Therein, the converter's output voltage, Vout, is compared with the output voltage command, Vout CMND on the line 21, in a summing junction 89. The error is passed on a line 91 through a proportional/integral gain 42a/45a to provide a correct, conditional value of duty cycle on a line 92. The proportional and integral gains 42a/45a are equivalent to the steps 42 and 45 which decrement or increment the duty cycle in FIG. 5. The output of the proportional/integral gain on the line 92 passes through a fuel cell current limiting stage 40a (which is equivalent to the test 40 of FIG. 5 that assures decrementing the duty cycle should the fuel cell current be too high). The limiting device may typically comprise a summing junction to determine if the fuel cell current (Icel) on the line 57 exceeds the limit signal (Icel LIM) on the line 19, and if so, pass the error through a proportional/integral gain, to a line similar to line 92, together with a "less than" circuit which selects the lower of the two outputs, line 92 or the similar line relating to Icel to provide the duty cycle signal on a line 94.

Figure 11:
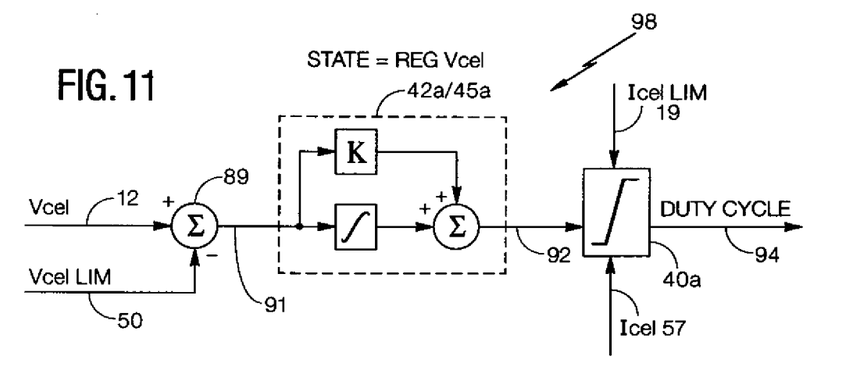

In FIG. 8, the state machine will remain in the state 87, where it regulates Vout, unless either of two parameters change. If the fuel cell voltage, Vcel, exceeds its limit, Vcel LIM, as indicated by a line 54a, the state machine 86 will advance to a state 98 in which it regulates the output voltage of the fuel cell, as illustrated in FIG. 11. The state 98 of FIG. 11 is identical to the state 87 of FIG. 10 except for the signals at the input to the summing junction 89. In FIG. 11, the fuel cell voltage (Vcel) is applied on the line 12 to the positive input of the summing junction 89, and the fuel cell limiting voltage, Vcel LIM, is applied on the line 50 to the negative input of the summing junction.

Once in the cell voltage regulating state 98, it will remain there unless the fuel cell voltage returns to a value below its limit. Then, it returns to the DC/DC converter output voltage regulating state 87, as indicated by line 54b. Conventional hysteresis may be provided between the conditions 54a and 54b to prevent hunting between states.

Figure 12:
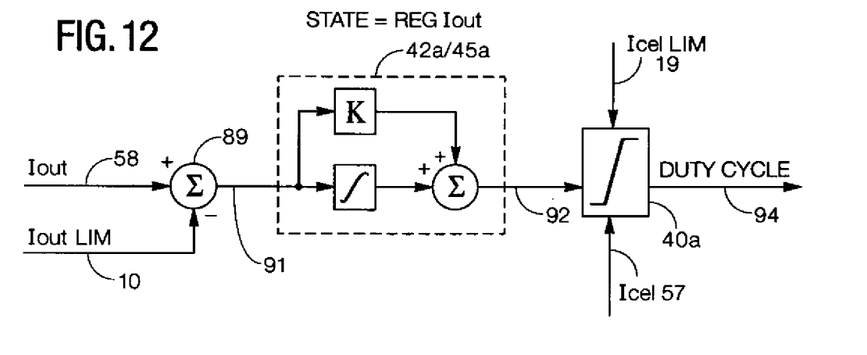

Another manner in which the state machine may advance out of the state 87 which regulates the DC/DC converter output voltage, is if the output current of the DC/DC converter exceeds its limit, as indicated by the line 43a. It then would reach a state 100 in which the DC/DC converter output current is regulated, as shown in FIG. 12. FIG. 12 is identical to FIGS. 10 and 11 except for the signals supplied to the summing junction 89. In the state 100, the output current of the DC/DC converter (Iout) on the line 58 is compared in the summing junction 89 with the limit for it, Iout LIM, on the line 20. The difference, if any, passing through the proportional and integral gain 42a/45a provides a tentative duty cycle signal on the line 92 which then may be substituted if the fuel cell current (Icel) is out of limit, as is described hereinbefore.

If either the DC/DC converter output voltage (Vout) or fuel cell voltage (Vcel) exceeds a corresponding limit, the state may revert to the state 87 where output voltage is regulated, or it may revert to state 98 where fuel cell voltage is regulated, respectively.

The expression of the modality herein in terms of a state machine does not alter the situation: the modality herein eliminates the need for voltage limiting of any sort, such as power dissipation or storage, since it causes the DC/DC converter to push power whenever necessary to retain the fuel cell voltage below its limit, (unless the DC/DC converter has an excessive output current) as described hereinbefore.

Figure 9:
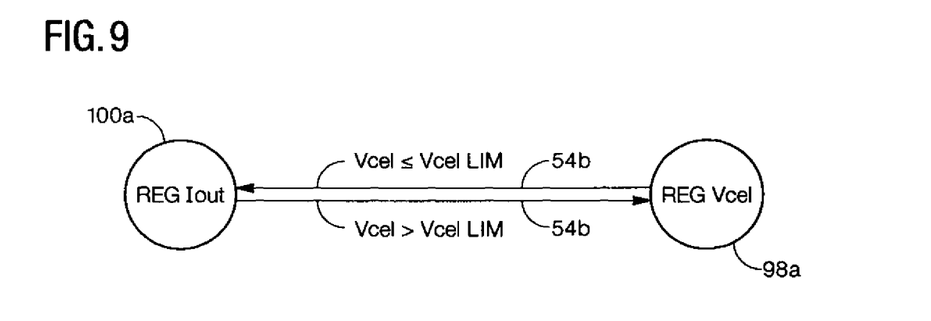
FIG. 9 is an illustration of a state machine implementing the present modality in a system which does not control output voltage.
Figure 13:
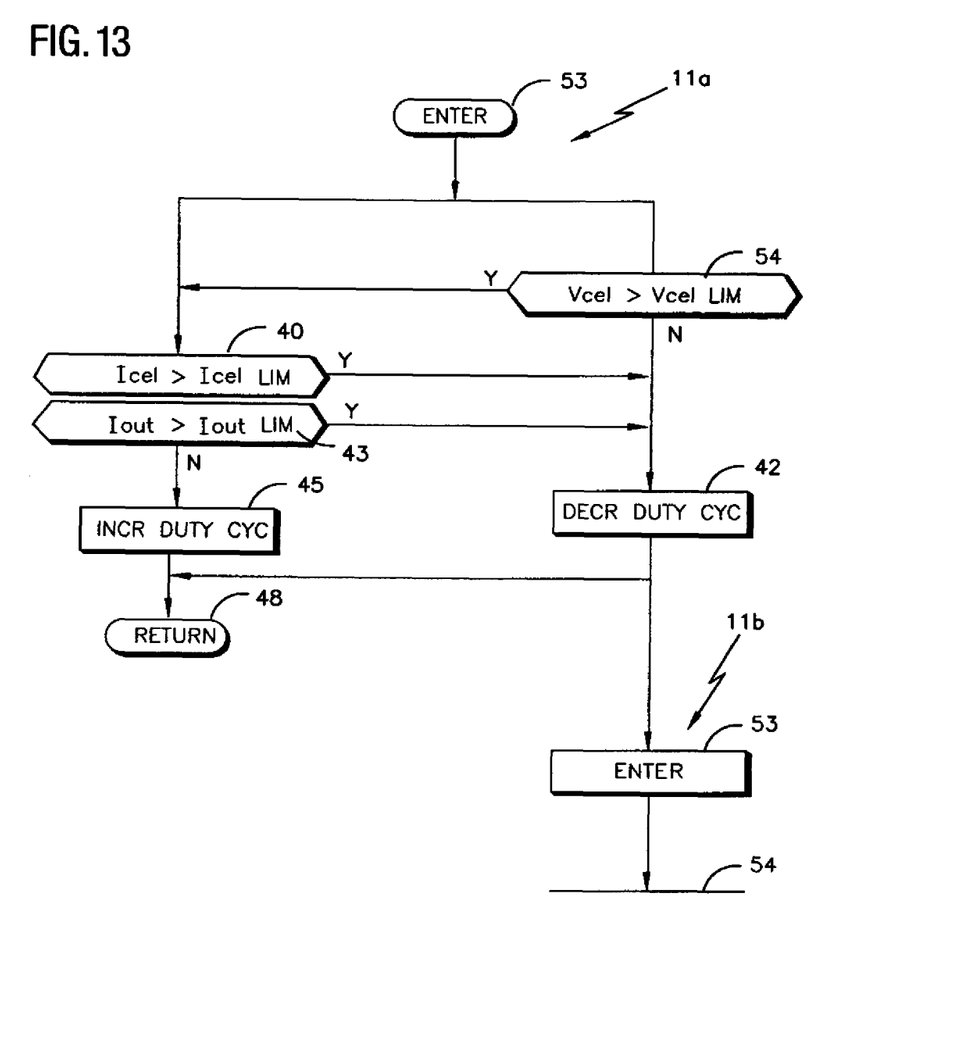
FIG. 13 is a simplified diagram of the present control strategy.

FIG. 9 illustrates a simplified state machine, one which may be used in a system that does not require control over the DC/DC converter output voltage. Normally, the state 100a will control the DC/DC converter so as to regulate its output current, Iout. But if the fuel cell voltage exceeds a limit, then the state machine of FIG. 9 will advance to the state 98a where the fuel cell voltage, Vcel, is regulated. Because of the states 98 and 98a, state machines illustrated in FIG. 8 and FIG. 9 will avoid the need to dump power when the output power of the fuel cell exceeds the load, since the DC/DC converter will push (increase) the power to assure that the fuel cell voltage remains in limit. A digital routine comparable to the state machine of FIG. 9 is shown in FIG. 13. FIG. 13 is identical to FIG. 5 except there is no control over converter output voltage—no test 38.

Since changes and variations of the disclosed embodiments may be made without departing from the concept's intent, it is not intended to limit the disclosure other than as required by the appended claims.

The invention claimed is:

1. A method comprising:
   receiving, by a DC/DC converter operatively coupled to an output of a DC power source, a DC power source voltage output signal indicative of a value of an output voltage of the DC power source;
   determining, by the DC/DC converter, whether the output voltage of the DC power source exceeds a first limiting value based on the received DC power source voltage output signal; and
   responsive to determining the output voltage of the DC power source exceeds the first limiting value,
      comparing, by the DC/DC converter, the value of an output current of the DC power source to a second limiting value;
      comparing, by the DC/DC converter, the value of an output current of the DC/DC converter to a third limiting value; and
      responsive to determining that the output current of the DC power source is below the second limiting value and the output current of the DC/DC converter is below the third limiting value, operating the DC/DC converter to increase power output of the DC power source to decrease the value of the output voltage of the DC power source to a value which is at or below the first limiting value.

2. A method according to claim 1 wherein receiving an output of a DC power source comprises receiving an output of a fuel cell power plant.

3. The method of claim 2 wherein the output voltage of the DC power source is a cell voltage in a fuel cell stack of the fuel cell power plant.

4. An apparatus comprising:
   a DC power source having an output voltage with a first limiting value which should not be exceeded; and
   a DC/DC converter operatively coupled to an output of the DC power source, in operation the DC/DC converter:
      determines whether the first limiting value of the output voltage of the DC power source has been exceeded, and if so,
         compares the value of an output current of the DC power source to a second limiting value;
         compares the value of an output current of the DC/DC converter to a third limiting value; and
         responsive to determining that the output current of the DC power source is below the second limiting value and the output current of the DC/DC converter is below the third limiting value, increases a power output of the DC/DC converter.

5. A method of controlling a DC power source having an output voltage with a first limiting value which should not be exceeded, and providing power from the DC power source to a DC/DC converter in which power conversion is controlled by a control strategy to convert output power of the DC power source to provide a desired output of the DC/DC converter, the method comprising:
   determining, by the DC/DC converter, whether the first limiting value of the output voltage of the DC power source has been exceeded, and if so,
      comparing, by the DC/DC converter, the value of an output current of the DC power source to a second limiting value;
      comparing, by the DC/DC converter, the value of an output current of the DC/DC converter to a third limiting value; and
      responsive to determining that the output current of the DC power source is below the second limiting value and the output current of the DC/DC converter is below the third limiting value, causing an increase in the power output of the DC/DC converter.

* * * * *